(12) United States Patent
Link et al.

(10) Patent No.: US 12,521,245 B2
(45) Date of Patent: Jan. 13, 2026

(54) COMBINATION OF AUGMENT AND REPLACEMENT PIECE FOR FILLING A BONE DEFECT

(71) Applicant: WALDEMAR LINK GmbH & Co. KG, Hamburg (DE)

(72) Inventors: Helmut D. Link, Hamburg (DE); Gunnar Erb, Hamburg (DE)

(73) Assignee: WALDEMAR LINK GmbH & Co. KG, Hamburg (DE)

( * ) Notice: Subject to any disclaimer, the term of this patent is extended or adjusted under 35 U.S.C. 154(b) by 1030 days.

(21) Appl. No.: 17/629,223

(22) PCT Filed: Jul. 23, 2020

(86) PCT No.: PCT/EP2020/070791
§ 371 (c)(1),
(2) Date: Jan. 21, 2022

(87) PCT Pub. No.: WO2021/013923
PCT Pub. Date: Jan. 28, 2021

(65) Prior Publication Data
US 2022/0265429 A1 Aug. 25, 2022

(30) Foreign Application Priority Data
Jul. 24, 2019 (EP) .................................... 19188179

(51) Int. Cl.
*A61F 2/30* (2006.01)
*A61F 2/38* (2006.01)

(52) U.S. Cl.
CPC ...... *A61F 2/30734* (2013.01); *A61F 2/30942* (2013.01); *A61F 2/389* (2013.01);
(Continued)

(58) Field of Classification Search
CPC .................. A61F 2/3886; A61F 2/389; A61F 2002/30604; A61F 2/384; A61F 2/3868
See application file for complete search history.

(56) References Cited

U.S. PATENT DOCUMENTS

| 6,068,658 A | * | 5/2000 | Insall | A61F 2/3868 623/20.3 |
| 7,083,652 B2 | * | 8/2006 | McCue | A61F 2/389 623/20.14 |

(Continued)

FOREIGN PATENT DOCUMENTS

| EP | 3909549 A1 * 11/2021 | ............. A61L 27/34 |
| WO | WO 2017/005512 A1 | 1/2017 |
| WO | WO 2019/046579 A1 | 3/2019 |

OTHER PUBLICATIONS

International Search Report and Written Opinion mailed Nov. 6, 2020 in corresponding International Application No. PCT/EP2020/070791 and the English Translation of the International Search Report.
(Continued)

*Primary Examiner* — Seema Mathew
(74) *Attorney, Agent, or Firm* — Chiesa Shahinian & Giantomasi PC

(57) ABSTRACT

Graft for a bone defect, in particular a tibial head graft for a knee-joint endoprosthesis. It comprises a sleeve-like inner body (2) for implantation at one end of a long bone (99). An outer face of the inner body (2) is designed as a bone contact face (20) for bearing on the surrounding bone margin (97). According to the invention, an outer shell piece (3) is provided which, as a bone replacement piece, is doubled onto the outside of the inner body (2) for filling a defect at the cortical bone margin (97) and is not dimensioned peripherally, such that, in the circumferential direction, it covers only a part of the outer circumference of the inner body (2).

(Continued)

Figure 1:
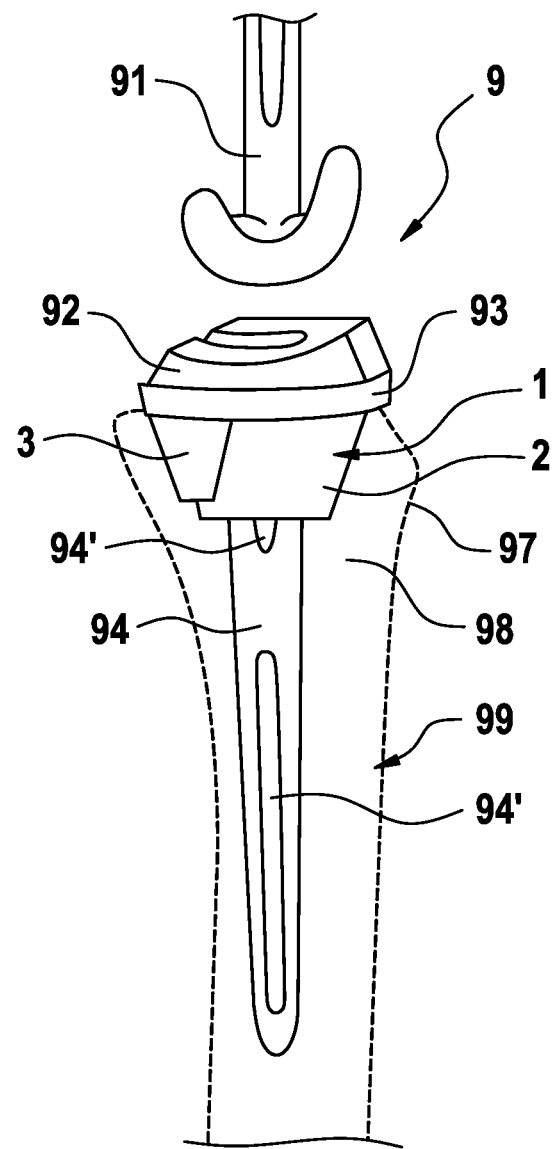

The doubled outer shell piece (3) forms a filler piece for a bone defect (bone window 96) at the bone end. Closure of the bone window (96) is achieved, and unwanted contact between the graft and surrounding soft-tissue parts is avoided. Moreover, the graft is thus also supported in the region of the bone window (96). Parts of the bone margin (97) that are still present can thus remain intact, allowing the greatest possible preservation of naturally present bone substance.

18 Claims, 7 Drawing Sheets

(52) U.S. Cl.
CPC ............... *A61F 2002/30011* (2013.01); *A61F 2002/30593* (2013.01); *A61F 2002/30594* (2013.01); *A61F 2002/30736* (2013.01); *A61F 2002/30828* (2013.01); *A61F 2002/30985* (2013.01)

(56) References Cited

U.S. PATENT DOCUMENTS

| | | | | |
|---|---|---|---|---|
| 7,175,665 | B2* | 2/2007 | German | A61F 2/30734 623/20.15 |
| 7,468,078 | B2* | 12/2008 | Sederholm | A61F 2/36 623/22.46 |
| 7,842,093 | B2 | 11/2010 | Peters et al. | |
| 8,206,453 | B2* | 6/2012 | Cooney, III | A61F 2/4261 623/21.12 |
| 8,366,782 | B2* | 2/2013 | Wright | A61F 2/38 623/20.15 |
| 12,059,361 | B2* | 8/2024 | Wolfson | A61B 17/164 |
| 2004/0049284 | A1* | 3/2004 | German | A61F 2/30734 623/20.15 |
| 2008/0021566 | A1* | 1/2008 | Peters | A61F 2/3886 623/20.29 |
| 2008/0167722 | A1* | 7/2008 | Metzger | A61F 2/30721 623/20.29 |
| 2012/0022658 | A1* | 1/2012 | Wentorf | A61F 2/389 623/20.28 |
| 2013/0013078 | A1* | 1/2013 | Hanssen | A61F 2/36 623/18.11 |
| 2014/0222155 | A1* | 8/2014 | Metzger | A61F 2/30734 623/20.15 |
| 2014/0257499 | A1 | 9/2014 | Winslow et al. | |
| 2014/0277528 | A1* | 9/2014 | Mines | A61F 2/30734 623/20.14 |
| 2016/0184099 | A1* | 6/2016 | Gotfried | A61F 2/30734 623/18.11 |
| 2016/0199071 | A1 | 7/2016 | Collazo | |
| 2016/0287397 | A1* | 10/2016 | Wentorf | A61F 2/4684 |
| 2019/0015215 | A1 | 1/2019 | Marlow | |
| 2021/0228366 | A1* | 7/2021 | Heggs | A61F 2/389 |
| 2021/0307919 | A1* | 10/2021 | Paterson | A61F 2/4081 |
| 2023/0114476 | A1* | 4/2023 | Fiedler | A61F 2/3859 623/20.15 |
| 2023/0190478 | A1* | 6/2023 | Webb | A61B 17/16 623/20.16 |
| 2023/0190494 | A1* | 6/2023 | Webb | A61F 2/389 623/20.16 |
| 2024/0033065 | A1* | 2/2024 | Nguyen | A61F 2/02 |
| 2024/0058133 | A1* | 2/2024 | Bisek | A61F 2/30767 |
| 2024/0091019 | A1* | 3/2024 | Hirt | A61F 2/3859 |
| 2024/0350275 | A1* | 10/2024 | Hodorek | A61F 2/30734 |
| 2025/0057658 | A1* | 2/2025 | Arnold | A61B 17/1659 |

OTHER PUBLICATIONS

Search Report dated Jan. 20, 2020 issued in corresponding European Application No. 19188179.6.

* cited by examiner a)

b)

a)

b)

a)

b)

c)

a)

b)

a)

b)

c)

COMBINATION OF AUGMENT AND REPLACEMENT PIECE FOR FILLING A BONE DEFECT

CROSS-REFERENCE TO RELATED APPLICATIONS

This application is the National Stage entry under 35 U.S.C. § 371 of International Application No. PCT/EP2020/070791 filed on Jul. 23, 2020, published on Jan. 28, 2021 under Publication Number WO 2021/013923 A1, which claims the benefit of priority under 35 U.S.C. § 119 of European Patent Application Number 19188179.6 filed Jul. 24, 2019, the entireties of which are herein incorporated by reference.

The invention relates to an augment for a bone defect, in particular a tibial head augment for a knee-joint endoprosthesis. It comprises a sleeve-like inner body for implantation at one end of a long bone. The inner body has a channel, which extends from the top downward through the sleeve and serves to receive a prosthesis stem, and a wall surrounding the channel, wherein an outer face of the wall is designed as a bone contact surface for bearing on a bone edge (comprising cancellous bone regions on the inside and cortical regions on the outside) surrounding the inner body.

When implanting endoprostheses, in particular joint endoprostheses, a problem sometimes arises whereby the bone that receives the endoprosthesis is damaged, specifically in the epiphysis and metaphysis. This is due in particular to defects on the (cancellous and/or cortical) bone substance or bone surface, for example as a result of disease and/or as a result of the explanation of an earlier prosthesis and as a result of accidents. To create a sufficient base in the bone for anchoring the endoprosthesis, augments are typically used, which are designed as conical sleeves in particular, in order to adapt to the shape of the epiphysis and the metaphysis. They are implanted into the end of the bone in such a way that they are arranged in a recessed position and are surrounded like a quiver by the cortical margin of the end of the bone.

Particular problems arise when there is extensive bone loss at the proximal end of the bone, as a result of which the latter is partially open to the outside. The augment is then no longer enclosed in the bone quiver, and instead the latter is open at at least one location. The augment lies exposed at this defect in the bone edge, which is unfavorable as regards surrounding soft tissue parts. In addition, the bone edge is weakened at this location. Conventionally, in such cases, the entire head of the bone is often removed and replaced by a shape-filling implant. A disadvantage of this is that the bone remnant still present is removed in the process, and therefore any chance of regeneration of the bone is lost.

The object of the invention is to make available an improved augment which in such cases allows bone to be preserved and promotes regeneration.

The solution according to the invention lies in an augment and a corresponding manufacturing method according to the features of the independent claims. Advantageous developments are the subject matter of the dependent claims.

In an augment for a bone defect, in particular a tibial head augment, comprising an inner body, designed as a (regularly or irregularly) shaped sleeve, in particular as a cone, for implantation at one end (epiphysis and metaphysis) of a long bone, wherein the inner body comprises a channel, which extends from the top downward through the sleeve and serves to receive a prosthesis and/or a prosthesis stem, and a wall surrounding the channel, wherein an outer face of the wall is designed as a bone contact surface for bearing on a bone edge surrounding the inner body, according to the invention an outer shell piece is provided which, as a bone replacement piece for filling (filler piece) a defect (cortical gap) at the bone edge, is doubled onto the outside of the inner body and is not dimensioned circumferentially, such that in the circumferential direction it covers only a part of the outer circumference of the inner body.

Some of the terms used are first explained below.

In this context, doubled is understood to mean that an additional structural element is applied to a base body (in the present case the inner body). Typically, the additional structural element (here the outer shell piece) is rigidly connected to the base body, either by a continuous connection or by several individual connections. Typically, the additional element can differ from the base body in terms of material properties, for example stiffness, porosity, surface characteristics, etc., but it does not have to.

A bone window is understood to mean an opening that has arisen due to a (generally undesired) defect in bone substance, in particular in the cortical region.

The channel is a through-opening which extends from the top downward over the height of the augment. A prosthesis or a prosthesis part can be received therein; in particular the stem of the prosthesis can be pushed through.

The invention is based on the concept of using the doubled outer shell piece to create a filler piece which closes the bone window, hence the undesired opening at the end of the bone. In this way, on the one hand, the bone window is closed and undesired contact between the augment itself and the surrounding soft tissue parts is thereby avoided. Strengthening and stiffening are also achieved, so that by virtue of the doubled outer shell piece the actual augment is also supported in the region of the bone window. In addition, and this is often of decisive importance for long-term stability, the still remaining parts of the bone edge (in the region without doubling) can thus be preserved at the end of the bone, which is generally advantageous in terms of the greatest possible preservation of the naturally present bone substance. Moreover, the chance thus remains that the bone will partially regenerate again. The long-term stability improves, and the danger of risky revision surgery decreases.

It is particularly expedient here if the outer shell piece is designed as a likeness of the bone defect (bone window). This permits a particularly precise replacement of the bone defect and ensures optimal support. For this purpose, provision is preferably made that the outer shell piece is formed by means of an additive manufacturing method, in particular by means of 3D printing.

It is preferably further provided that the outer shell piece has on its outer surface a contour that is similar to the bone edge. The outer shell piece thus continues the outer contour of the end of the bone and thus blends favorably into its surroundings. In this way, irritation of surrounding tissue can be prevented. Moreover, the regeneration behavior of the bone can also be improved as a result. The outer shell piece preferably has an at least substantially constant thickness in the circumferential direction. This results in a similarity of shape, i.e. the outer contour of the outer shell piece is geometrically similar to the contour of the outer face of the wall of the inner body. Here, "geometrically similar" means that the outer contour of the outer shell piece is at least substantially obtained by a homothety of the outer contour of the inner body.

The inner body forming the core of the augment is expediently free from the outer shell piece in the region of its lower end. This means that the outer shell piece does not extend all the way down, and instead a circumferential region at the bottom of the inner body remains free from the outer shell piece. There is therefore no thickening caused by the outer shell piece in the lower region of the inner body. The inner body is thus easier to insert into the bone quiver formed on the head.

The outer surface of the outer shell piece is advantageously of a different nature than the outer face of the wall of the inner body. Particularly preferred is a configuration of the outer shell piece in which it has a solid (non-porous) outer surface. In other words, the doubling is therefore located where the outer surface is designed differently (solid); in particular the outer surface of the outer shell piece is made solid, while the outer face of the wall of the inner body has porosities. As a result of the solid design, it is matched to the closed surface structure of the adjacent bone edge. Moreover, the solid surface counteracts undesired attachment of soft tissue parts. The outer surface of the outer shell piece thus differs from the surface of the outer face of the wall of the inner body, which is expediently designed to be porous. This promotes osseointegration of the augment on the inside of the bone in the bone quiver, more precisely in the cancellous bone or cortex of the bone present there.

The outer shell piece advantageously has anchoring grooves or holes or bores on its outer face. These permit the reception of fastening means for additional anchoring to the residual bone. Preferably, the anchoring grooves are designed to receive fastening wires, in particular cerclage wires. In this way, it is possible to achieve secure and surgically easy-to-use additional fastening and stabilization, especially of the fragile residual bone.

The outer shell piece is expediently stiffer than the inner body. It is thus better adapted to the greater stiffness of the bone in its edge region, such that overall there is a force flow that is better adapted to the anatomical conditions at the end of the bone. The outer shell piece is expediently made of the same material as the inner body, but is stiffer on account of different shaping. The greater stiffness can here be achieved in particular by the fact that the outer shell piece has a lower porosity than the inner body and is preferably solid.

It is particularly advantageous if the outer shell piece has a freely pre-selectable outline contour which can be adapted to the bone defect, in particular at the end of the tibia. According to this aspect of the invention, it is already possible at the time of manufacture to make available a precisely fitting outer shell piece which exactly closes the bone defect. In this case, the determination of the bone defect and the selection of the outline contour of the outer shell based thereon are preferably carried out on a CT (or other computer-assisted imaging method) of the affected bone of the patient. A design of the outer shell piece tailored to the individual anatomical conditions of the respective patient can be implemented such that optimal bone support and, if necessary, regeneration are obtained. It can be expedient to provide at least the outer shell piece with oversize in order to have sufficient material available for (in particular intraoperative) fine adjustment by the surgeon. "Oversize" is understood to mean that the outer shell piece is dimensioned larger than is necessary for closing or covering the bone defect itself. Sufficient excess material is thus available at the edges of the outer shell piece to allow the operating surgeon to make fine adjustments, if appropriate also intraoperatively.

The outer shell piece expediently has a support saddle in its lower region. This support saddle is provided such that the outer shell piece can be placed with it on a cortical region of the long bone, in order thereby to achieve a flush connection of the outer shell piece to the surrounding bone. If necessary, the placement also permits a reliable transmission of force between the outer shell piece and the hard cortical region of the long bone that is well suited for force transmission. The support saddle is preferably arranged higher on the augment than the lower end of the inner body. This affords the advantage that the implant is free at its lower end from the outwardly protruding outer shell piece, such that it is narrower overall at the lower end and can be inserted more easily into the bone quiver at the end of the bone.

Transitions between the outer shell piece on the one hand and the inner body on the other hand are preferably rounded. This avoids irritation or even damage to surrounding bone tissue during insertion of the augment.

The thickness of the outer shell piece is generally not constant but varies depending on position. In particular, the thickness varies along the circumference and/or over the height of the outer shell piece. A finer adaptation to the bone defect and to its dimensions can thus be achieved.

The outer shell piece is advantageously provided with a receptacle for screw fastening at its upper end. In this way, the outer shell piece can also be securely anchored toward the top, from where the load is applied in the implanted state. For example, in the case of an augment for the tibial bone, a screw connection can be provided on a tibial plateau of a knee-joint endoprosthesis. However, it can also be made hollow.

The outer shell piece can be welded to the inner body. However, it is preferably designed or manufactured in one piece with the inner body, in particular by means of an additive manufacturing process, for example 3D printing or selective laser sintering (SLS) or electron beam melting (EBM).

The outer shell piece is expediently designed such that it merges at its upper end into the inner body, with the outer contour of the inner body preferably being retained. Thus, the contour at the upper end of the augment is always the same, irrespective of whether or how the outer shell piece is designed. This permits simplified use and, in particular, allows the surgeon to switch if necessary to another augment, for example one without an outer shell piece, even during the operation (intraoperatively).

Furthermore, the inner body can expediently be provided from the top downward with a slot that passes through the wall. The slot permits a compression of the augment, such that the outer circumference of the augment can be varied in this way. This results in an elastic configuration of the overall shape of the augment. It can thus be better adapted to the size of the bone quiver receiving the augment. This also affords the advantage that an adaptation to the respective anatomical conditions of the patient can thus be achieved with a few standard sizes. The compression also affords the advantage that, as a result of elastic forces, a certain bone-forming stimulus can be exerted on the surrounding bone tissue, which promotes the incorporation of bone substance.

The slot is preferably not open, but formed by two mutually overlapping tongues between which a labyrinthine free space is created. An undesired passage of material, for example of bone cement for fastening an endoprosthesis, through the wall of the augment can thus be prevented, since the free space functions as a labyrinth seal. Furthermore, the mutually overlapping tongues permit length compensation, such that it is possible to compensate for the change in the outer circumference of the augment caused by compression.

It is also possible for several outer shell pieces to be provided. It applies for each of them that they are not designed circumferentially, and even in their entirety they do not completely enclose the inner body. It also applies here that the outer shell pieces are only partially arranged in order to fill or close corresponding defects in the surrounding bone edge. However, the several outer shell pieces do not necessarily have to be arranged in one plane, and instead they can also be arranged at different heights, that is to say in different planes. This makes it possible to compensate for bone defects even in regions of the bone that are located farther away from the end of the bone.

The invention also relates to a method for manufacturing an augment for a bone defect, in particular a tibial head augment for a knee-joint endoprosthesis, comprising an inner body, designed as a (regularly or irregularly) shaped sleeve, in particular as a cone, for implantation at one end of a long bone, wherein the inner body comprises a channel, which extends from the top downward through the sleeve and serves to receive a prosthesis stem, and a wall surrounding the channel, wherein an outer face of the wall is designed as a bone contact surface for bearing on a bone edge surrounding the inner body, with the following steps: measuring one end of a long bone; determining a bone defect in a bone edge surrounding the augment; determining an outer shell piece with a contour for filling the bone defect; and manufacturing a hybrid body comprising the augment and the outer shell piece, preferably by means of an additive method, in particular 3D printing, EBM or SLM. At least the outer shell piece is expediently manufactured with an oversize.

For a more detailed explanation, reference is made to the above description, which also applies by analogy to the method.

Figure 3:
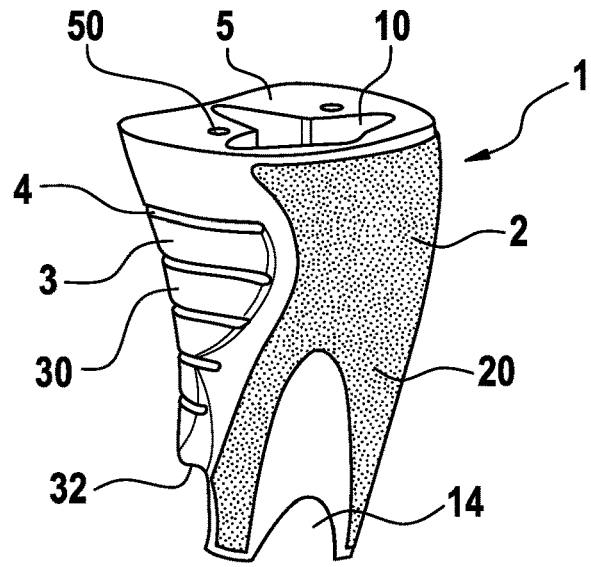
Figure 6:
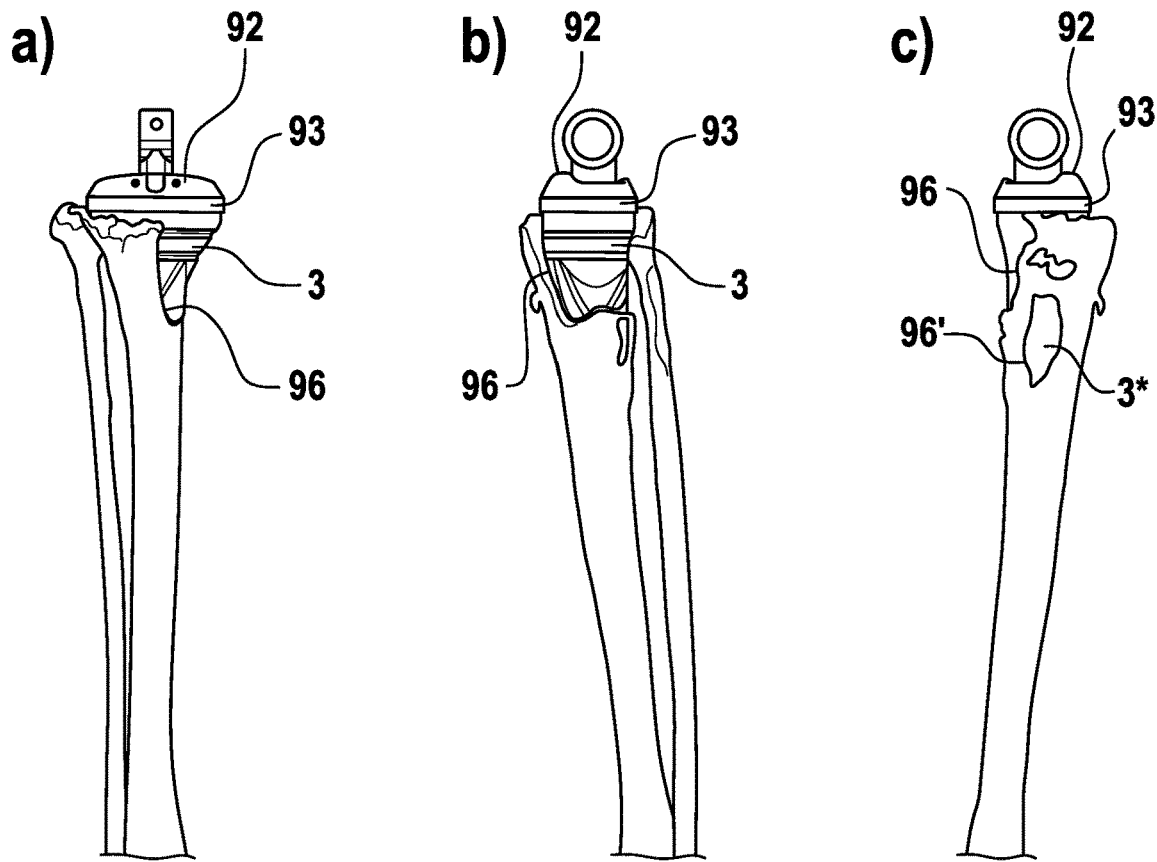
Figure 9:
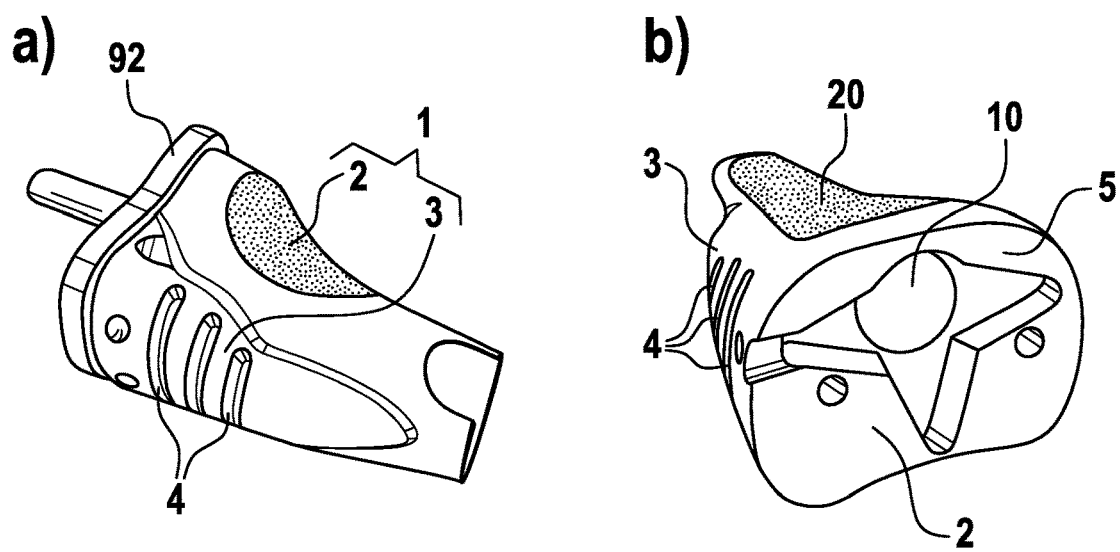
Figure 10:
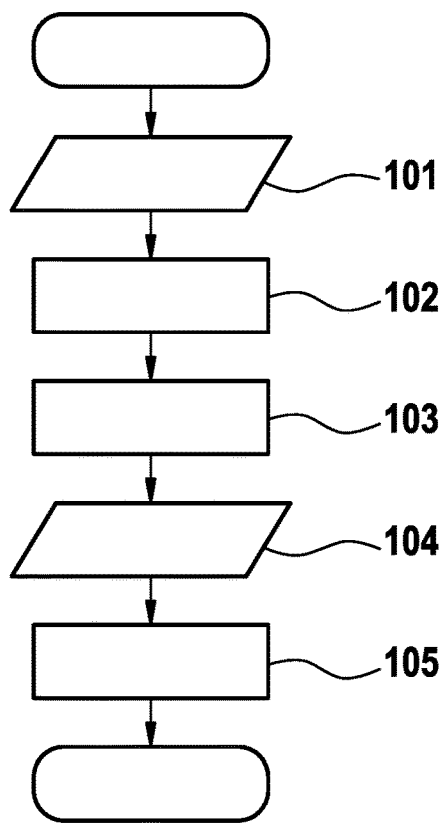
Figure 11:
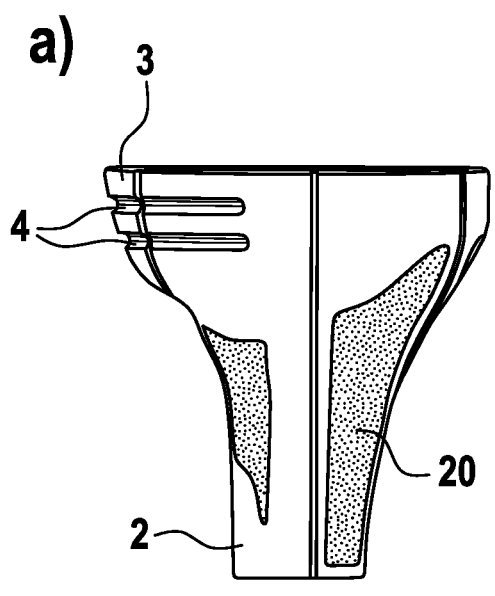
Figure 11:
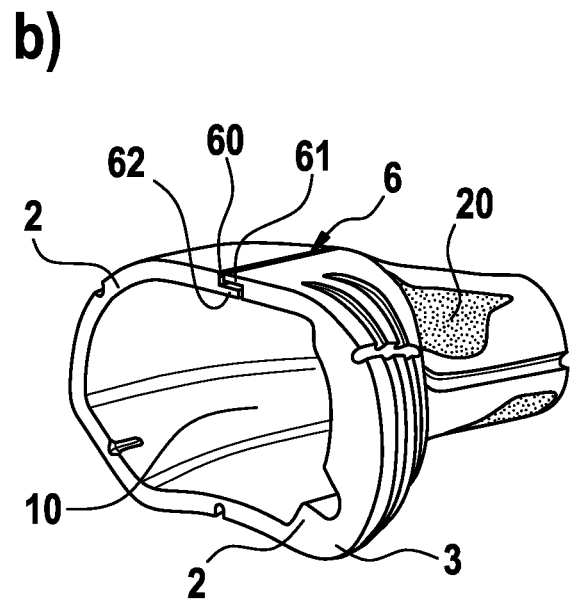
Figure 11:
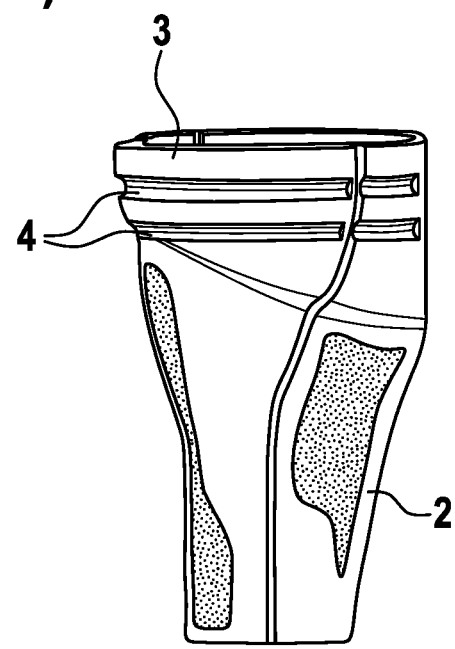
Figure 12:
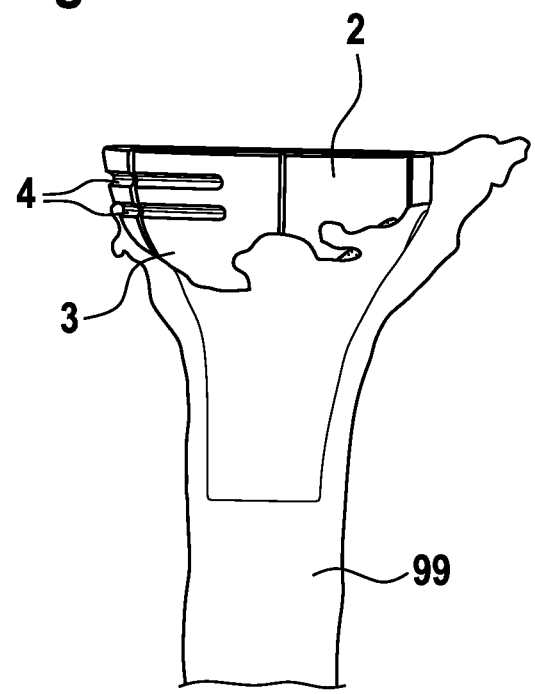

The invention is explained in more detail below on the basis of advantageous embodiments and with reference to the accompanying drawing, in which:

FIG. 1 shows a schematic view illustrating an augment according to the present invention in connection with a knee-joint endoprosthesis;

FIGS. 2a, b show a frontal view and a lateral view of a first embodiment of an augment according to the invention arranged in the knee joint;

FIG. 3 shows a perspective view of the augment according to the first embodiment;

FIGS. 4a, b show a frontal view and a lateral view of a second embodiment of an augment according to the invention;

FIGS. 5a-c show a frontal view, a lateral view and a posterior view of the second embodiment arranged on the tibial bone;

FIGS. 6a-c show a frontal view and two lateral views of a third embodiment arranged on the tibial bone;

FIGS. 7a, b show computer-aided diagnostic images of bone degeneration at the knee joint;

FIGS. 8a, b show a lateral view and a frontal view of a computer simulation of an augment according to a fourth embodiment;

FIGS. 9a, b show perspective views of a manufactured augment according to FIGS. 8a, b; and FIG. 10 shows a flowchart of a manufacturing method;

FIGS. 11a-c show perspective views of augments according to a fifth embodiment; and FIG. 12 shows a frontal view of the fifth embodiment arranged on the tibial bone.

The invention is explained below on the basis of an example of an augment for a knee-joint endoprosthesis, more precisely an augment arranged on the proximal head of the tibia. The augment is to be distinguished from the prosthesis, i.e. the augment is not an element of the actual prosthesis. The augment strengthens the bone and thus increases or improves the capacity of the latter for holding the prosthesis. Augments according to the invention can of course also be provided on other bones.

FIG. 1 shows a schematic view of a knee-joint endoprosthesis, which is designated in its entirety by reference number 9. It comprises a femoral component 91 to be arranged on the femur (not shown), and a tibial component to be arranged on the proximal end of a tibial bone 99, which tibial component has a tibial plateau 93 with a bearing piece 92 arranged thereon and with a distally protruding stem 94 with fastening ribs 94'. Also shown is an augment according to the invention, which is designated in its entirety by reference number 1. It has an inner body 2, which is designed as a cone-shaped sleeve through which the stem 94 of the tibial component of the knee-joint endoprosthesis 9 is inserted, and an outer shell piece 3 which is arranged at a defined, singular location on the outside of the inner body 2. The upper region of the tibial bone 99 is referred to as the tibial head 98 and has a bone edge 97 surrounding the augment 1, more precisely at least the inner body 2, like a girdle.

Figure 2:
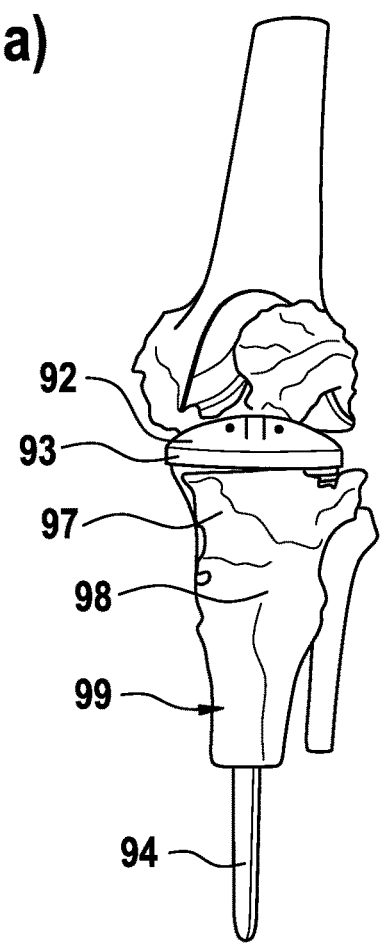
Figure 2:
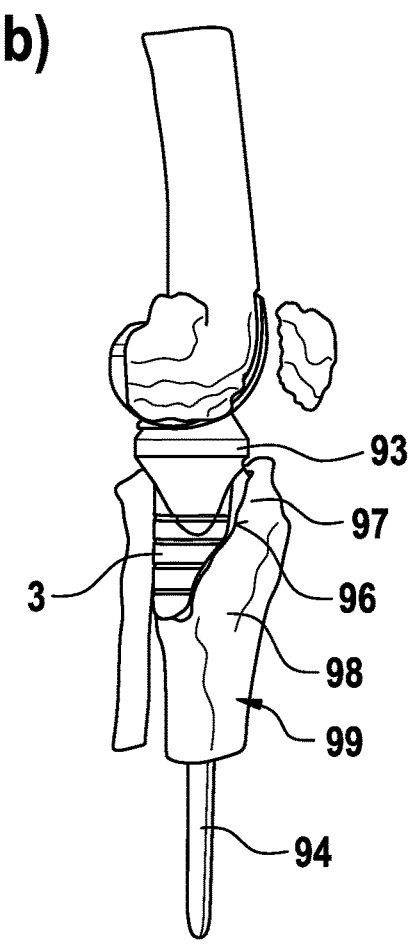

A first embodiment of an augment according to the present invention is shown in FIGS. 2 and 3. Reference is made first to FIGS. 2a, b, which show a view from the front (FIG. 2a) and a view from the side (FIG. 2b). In the frontal view according to FIG. 2a, the tibial component of the knee-joint endoprosthesis 9 inserted on the tibial head 98 can be seen, wherein the tibial plateau 93 with the bearing piece 92 lies on the top of the tibial head. The stem 94 of the knee-joint endoprosthesis 9 protrudes downward, its distal part being able to be seen in the illustration by means of a cutaway view.

In the frontal view, the tibial head 98 substantially surrounds the augment 1, in particular the inner body 2 thereof. This largely corresponds to the desired normal state. However, the actual defect can be seen in the lateral view, as shown in FIG. 2b. It can be clearly seen there that the tibial head 98 is missing a considerable portion of the bone edge 97, such that a bone window 96 of considerable size is present. At this location, unlike at other locations, the inner body 2 of the augment is not surrounded by the bone edge 97 and is therefore not fully recessed in the tibial head, and instead it would be accessible from the outside. However, as has already been explained in the introduction to the description, this is undesirable. Therefore, the augment according to the invention is provided with an outer shell piece 3, which is positioned and dimensioned such that it is arranged exactly in the region of the bone window 96 and fills the latter. This can be seen clearly in FIG. 2b, where the outer shell piece 3 fills the bone window 96 formed by the bone defect on the tibial head 98. The bone edge 97 is thus practically complete again. The inner body 2 lies protected within the tibial head 98, specifically in the bone quiver formed there.

A perspective view of this augment 1 is shown in FIG. 3. The inner body 2 can be seen, of which part of the outer circumference is covered by the outer shell piece 3. In the embodiment shown, the inner body 2 has a porous surface configuration 20, while the outer shell piece 3 has a continuous, solid (i.e. non-porous) surface configuration 30. The surface configuration 30 is smooth, but a plurality of anchoring grooves 4 are provided for better fastening, which anchoring grooves 4 are arranged in parallel in the horizontal direction for receiving cerclage wires (not shown). The outer shell piece 3 does not cover the entire outer circumference of the inner body 2, but only partially covers a defined location.

The outer shell piece 3 has a saddle 32 at its lower end. This saddle 32 is designed to attach at the lower end of the bone window 96 to the tibial bone 99 present there, more precisely to the hard outer cortical bone region of the tibial bone 99, which is well suited for load transmission. Thus, with the outer shell piece 3 according to the invention, not only is the bone window 96 in the bone edge 97 closed, that is to say the covering function restored, but it can also provide improved force transmission into the tibial head 98, such that a supporting function is also obtained. Sagging is prevented.

The transitions between the inner body 2, with its porous surface configuration 20, and the outer shell piece 3 are rounded, as can also be clearly seen in FIG. 3. This avoids irritation of surrounding tissue and also acts as a tolerance compensation in order to achieve better closure of the bone window 96.

At its lower end, the augment 1 is provided with a cutout 14. The latter is designed to create sufficient free space for the insertion of the stem 94 of the endoprosthesis in the case of an eccentric position of the stem 94, and thus to avoid a collision between the stem 94 and the lower region of the augment 1.

At the upper end of the augment 1, the outer shell piece 3 merges into a cover plate 5 shared with to the inner body 2, which cover plate 5 is substantially closed except for a large opening for access to the channel 10 in the inner body 2, through which the stem 94 of the tibial component of the knee-joint endoprosthesis 9 is inserted. The cover plate 5 has a receptacle for a screw fastening 50 with which the outer shell piece 3 can optionally be screwed to the tibial plateau 93.

Figure 4:
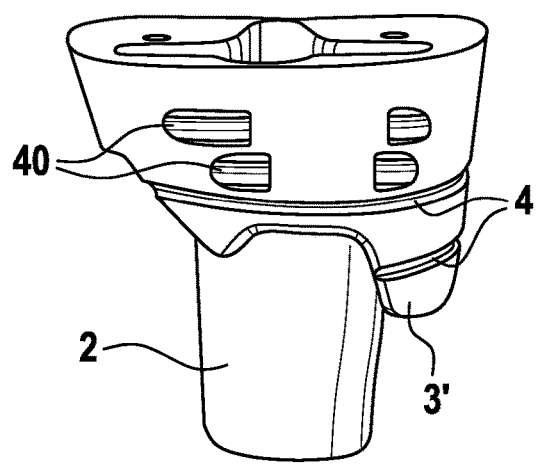
Figure 4:
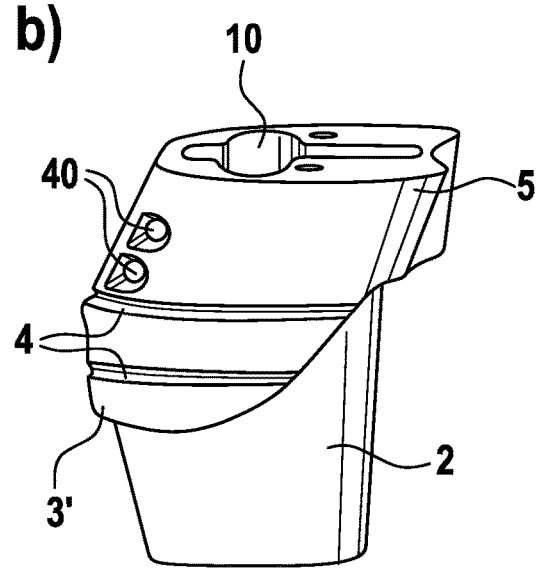
Figure 5:
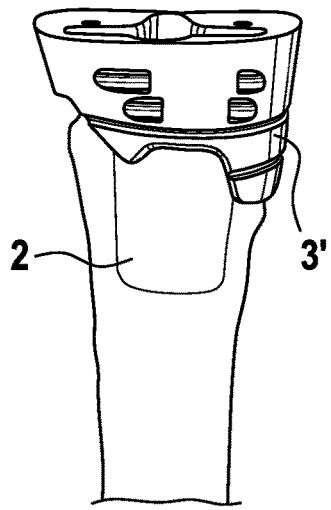
Figure 5:
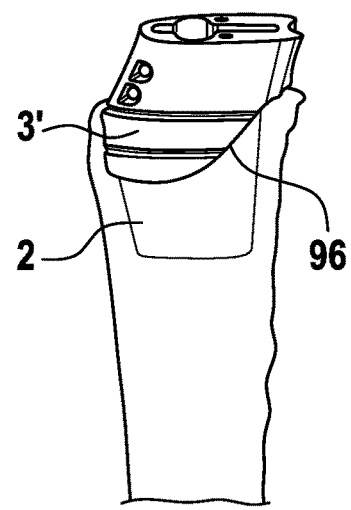
Figure 5:
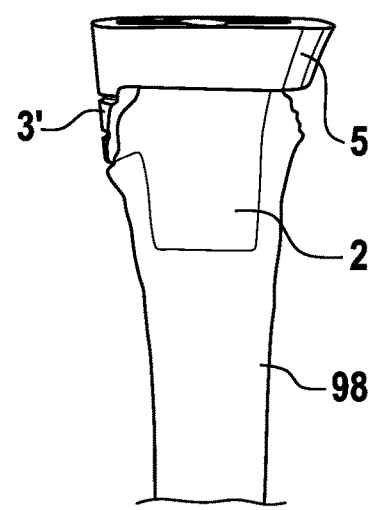

A second embodiment of an augment according to the invention is explained below with reference to FIGS. 4 and 5. FIGS. 4a and b show a frontal view and a lateral view of the second embodiment. The inner body 2, which is narrow in cross section, is clearly seen, which inner body 2 is partially covered by an outer shell piece 3' extending like an apron over part of its outer circumference. The surface configuration of the outer shell piece 3' is likewise solid, as before in the first embodiment, with anchoring grooves 4 arranged thereon for cerclage wires. In the upper region of the outer shell piece 3', additional openings 40 are provided which function as receptacles for further fastening means, in particular wires. A further increase in the fastening security and the positioning accuracy can thus be achieved. Furthermore, the additional openings 40 form anchoring locations to which suture materials can be attached in order to fix muscles and/or tendons. The outer shell piece 3' differs from the outer shell piece 3 of the first embodiment mainly in that it extends less far down, but for all that covers a larger region along the outer circumference. As has already been mentioned, the shape of the outer shell piece 3' depends on the bone window 96 that is to be filled on the tibial head 98.

It should be noted that an intermediate space can remain between the outer shell piece 3' and the inner body 2.

This is also optionally possible in all the other embodiments. By virtue of the intermediate space, the outer face of the outer shell piece 3' can extend beyond the actual bone window 96, such that an even better covering effect is achieved.

A third embodiment is shown in FIGS. 6a-c. The frontal view and a lateral view according to FIGS. 6a and 6b correspond substantially to FIGS. 5a and 5b. However, a special feature of the third embodiment lies in the provision of a second outer shell piece 3*, which is arranged in another (namely lower) plane. This is illustrated in FIG. 6c, which shows a further lateral view. This means that secondary bone defects, which can occur elsewhere for example, such as the further distal secondary bone defect 96', can also be covered with a suitable outer shell piece 3*. The scope of application of the invention is thus expanded considerably, since the invention is therefore also suitable for implantation in cases of severe or multiple bone defects.

Figure 7:
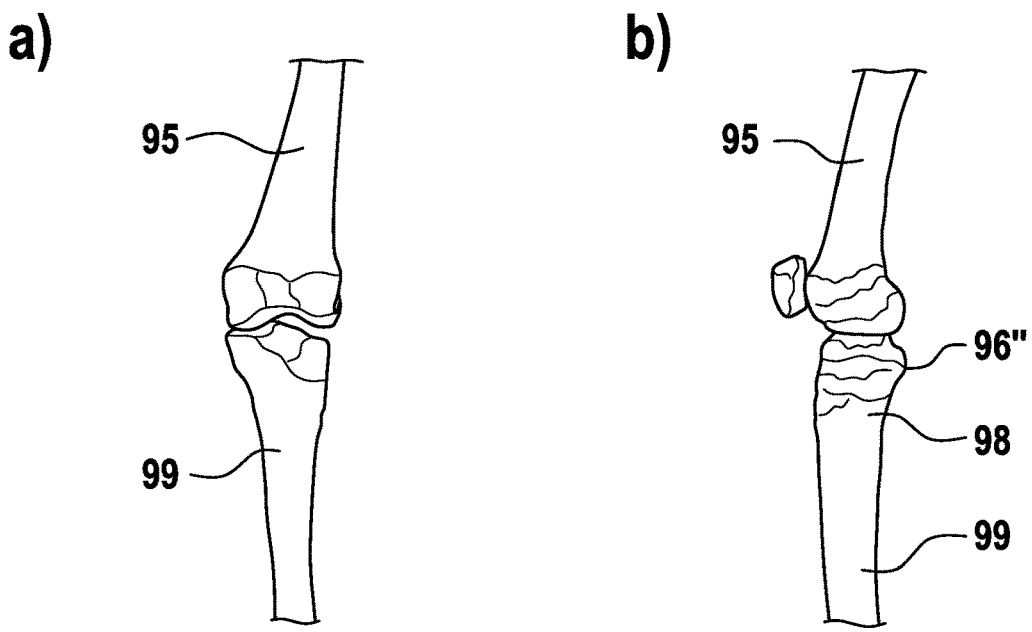
Figure 8:
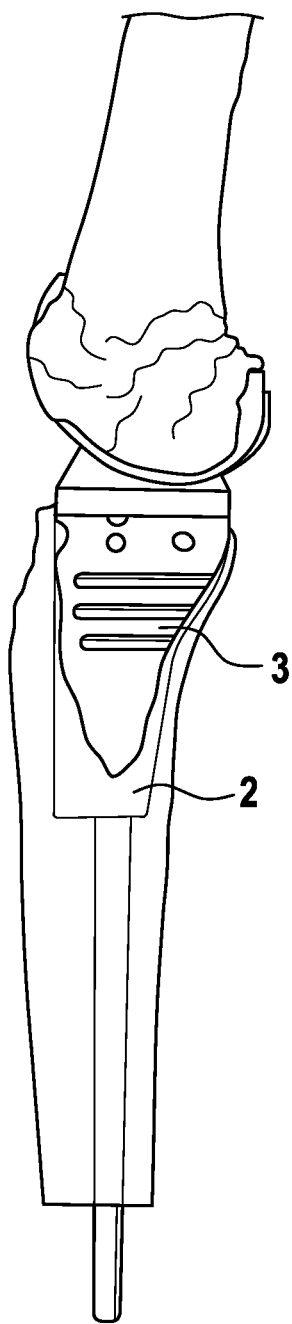
Figure 8:
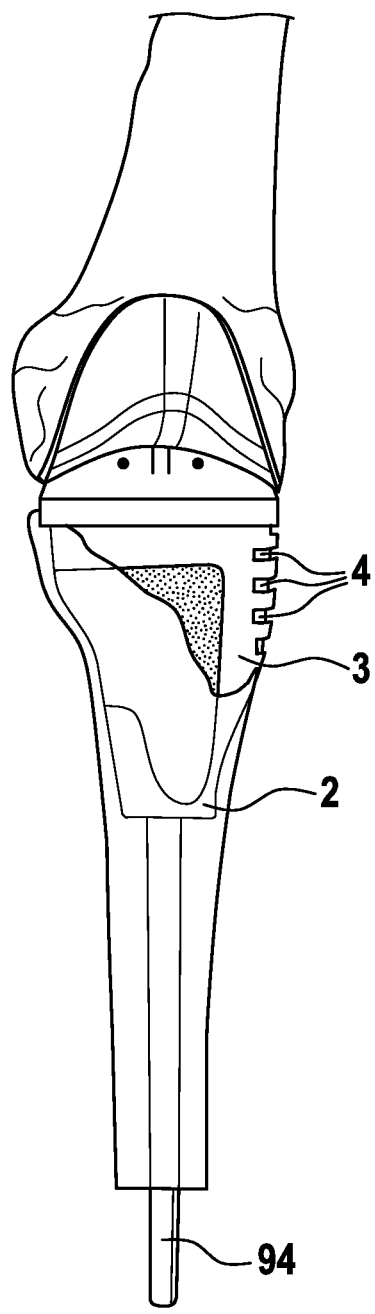

The way to obtaining the augment is shown in FIGS. 7 to 9. At the start, a kind of inventory is taken as regards the state of the bone on which the knee-joint endoprosthesis 9 is intended to be implanted. This is generally done by imaging methods, which are usually computer-assisted (in particular using CT data). It is thus possible to generate views from any direction using the diagnostic data. An example of such a diagnostic detection of a damaged knee joint is shown in FIGS. 7a, b. In the frontal view according to FIG. 7a, the bone regions of femur 95 and tibia 99 that are adjacent to the knee joint still appear largely undamaged, but in the lateral view according to FIG. 7b significant bone defects can be discerned. A bone defect 96" extending over a large surface area can be seen on the tibial head 98 in FIG. 7b. This defect is to be treated. In the next step, the positioning and dimensions of the bone defect 96" are determined, and from this it is determined how the outer shell piece 3 of an augment according to the invention has to look in order to cover or fill this bone defect and a bone window formed by the latter. This is usually done first as part of a computer-aided generation of the relevant information. This is visualized in FIGS. 8a and 8b. These show the augment with its inner body 2 and the outer shell piece 3 in a computer simulation, the outer shell piece 3 being positioned and dimensioned to cover the bone defect 96".

If the computer simulation proves successful and the feasibility of the implantation of the components themselves and the functionality of the knee-joint endoprosthesis 9 formed from them are ensured, the augment can be prepared accordingly in the next step. The production here is also computer-assisted, preferably by means of an additive method, in particular 3D printing or laser processes (for example SLM) or EBM. A correspondingly manufactured augment is shown in FIGS. 9a and 9b, with the tibial plateau 92 of the knee-joint endoprosthesis 9 also being shown for further clarity in FIG. 9a. FIG. 9b shows a view into the channel 10 of the inner body 2, which is intended to receive the stem 94. In the left-hand region of FIG. 9b, the outer shell piece 3 arranged on the lateral face can be seen, as determined in computer diagnostics (compare FIGS. 7b and 8a). On the solid outer wall of the outer shell piece 3, anchoring grooves 4 are arranged for cerclage wires. The outer shell piece is therefore custom-made for the specific bone defects and the anatomical conditions of the exact knee that was measured. In this way, the patient receives the best possible care, even and especially in the case of difficult indications in which, due to the bone defects, it was hitherto difficult or impossible to provide treatment using conventional augments.

The manufacturing process is visualized graphically in FIG. 10. At the outset, the relevant bone or joint is measured in step 101, as shown in FIGS. 7a and 7b. The next step 102 involves determination of a bone defect in the bone edge surrounding the augment, whereupon it is determined in step 103 how the outer shell piece 3 has to look and what contour and positioning it should have in order to cover the bone defect. Once this has been determined, the corresponding data are finally output in step 104 to a control unit for an additive manufacturing process, and then, finally, a corresponding augment is manufactured in step 105.

A fifth embodiment is shown in FIGS. 11a-c and 12. This embodiment differs from the others mainly in that the wall is made particularly thin for creating a large cavity 10, and a vertical slot 6 runs through the wall of the inner body 2, as can be clearly seen in the perspective view according to FIG. 11b. If the outer shell piece 3 is also arranged in the region of the slot, the slot 6 also extends into this. The slot 6 is not open, but is formed by two oppositely overlapping tongues 61, 62 between which a labyrinthine free space 60 is created.

This combines two advantages. On the one hand, the slot 6 functions as a kind of labyrinth seal and thus acts as a barrier against undesired passage of material through the slot 6, for example of cement used in the channel 10 to fix the prosthesis stem 94 (not shown in FIGS. 11 and 12) in the tibial bone 99.

On the other hand, the outer circumference of the augment can be compressed so that it can also be inserted into a somewhat smaller bone quiver at the end of the bone. This is a considerable advantage, since adaptation to the individual patient can thus be achieved by simple compression, and therefore a small number of standard augments is sufficient. An elastic design of the augments moreover affords the advantage that, as a result of the elastic restoring force, the surrounding bone tissue can be stimulated in a positive manner and thus stimulated to bone formation.

The channel 10 is made wide, specifically in such a way that the inner body 2 only has a relatively thin wall. This means that a lot of space is available for receiving a prosthesis stem 94, also with respect to polyaxial mounting of the prosthesis stem 94 (not shown in FIG. 12) in the bone 9. It should be noted that both the aspect of the thin wall and the aspect of the slot 6 are not limited to the fifth embodiment, and instead they can also be provided individually or jointly in other embodiments, including the preceding first to fourth embodiments. In other respects, the fifth embodiment substantially corresponds to the preceding embodiments, and therefore a further detailed explanation can be dispensed with.

The invention claimed is:

1. An augment for a bone defect comprising:
   an inner body, designed as a sleeve for implantation at one end of a long bone, wherein the inner body comprises:
   a channel, which extends from the top downward through the sleeve and serves to receive a prosthesis stem, and
   a wall surrounding the channel, wherein an outer face of the wall is designed as a bone contact surface for bearing on a bone edge surrounding the inner body, said bone contact surface comprising:
   an outer shell piece bone replacement piece for filling a defect on the cortical bone edge, which is outside of the inner body and not dimensioned circumferentially, such that in the circumferential direction said outer shell covers only a part of the outer circumference of the inner body, wherein the outer shell piece has a lower region, a support saddle to rest on a cortical region of the long bone, wherein the support saddle is arranged higher than the lower end of the inner body.

2. The augment as claimed in claim 1, characterized in that the outer shell piece is designed as a likeness of a bone defect.

3. The augment as claimed in claim 1, wherein the outer shell piece has, on its outer surface, a contour similar to the bone edge, wherein the outer shell piece has a substantially constant thickness in the circumferential direction.

4. The augment of claim 1, wherein the inner body is free from the outer shell piece in the region of its lower end.

5. The augment of claim 1, wherein the outer surface in the region of the outer shell piece is different from the outer face of the wall of the inner body, and wherein the outer shell piece has a solid outer surface and the outer face of the wall of the inner body is porous.

6. The augment of claim 1, wherein the outer shell piece has anchoring grooves or holes to receive fastening wires.

7. The augment of claim 1, wherein the outer shell piece is stiffer than the inner body, has a lower porosity than the inner body, and is made of the same material as the inner body.

8. The augment of claim 1, wherein the outer shell piece is welded to the inner body or is manufactured integrally with the inner body by means of an additive manufacturing process.

9. The augment of claim 1, wherein the outer shell piece has a freely pre-selectable outline contour adapted to a bone defect of the bone edge.

10. The augment of claim 1, wherein transitions between outer shell piece and inner body are rounded.

11. The augment of claim 1, wherein a thickness of the outer shell piece varies, preferably over the height or along the circumference.

12. The augment of claim 1, wherein the outer shell piece merges at its upper end into a cover plate shared with the inner body, wherein the outer contour of the inner body is retained, or the outer shell piece has at its upper end a receptacle for a screw fastening, or the outer shell piece is hollow.

13. The augment of claim 1, wherein the outer shell comprises several pieces, which are each non-circumferential and in their entirety do not enclose the inner body, wherein at least one of the outer shell pieces is arranged at a different height from another one.

14. The augment of claim 1, wherein the inner body has a slot passing through its wall and the slot has a free space between two mutually overlapping tongues.

15. An augment for a bone defect comprising:
   an inner body, designed as a sleeve for implantation at one end of a long bone, wherein the inner body comprises, wherein the inner body has a slot passing through its wall and the slot has a free space between two mutually overlapping tongues:
   a channel, which extends from the top downward through the sleeve and serves to receive a prosthesis stem, and
   a wall surrounding the channel, wherein an outer face of the wall is designed as a bone contact surface for bearing on a bone edge surrounding the inner body, said bone contact surface comprising:
   an outer shell piece bone replacement piece for filling a defect on the cortical bone edge, which is outside of the inner body and not dimensioned circumferentially, such that in the circumferential direction said outer shell covers only a part of the outer circumference of the inner body.

16. The augment as claimed in claim 15, wherein the outer shell piece has, on its outer surface, a contour similar to the bone edge, wherein the outer shell piece has a substantially constant thickness in the circumferential direction.

17. The augment of claim 15, wherein the inner body is free from the outer shell piece in the region of its lower end.

18. The augment of claim 15, wherein the outer surface in the region of the outer shell piece is different from the outer face of the wall of the inner body, and wherein the outer shell piece has a solid outer surface and the outer face of the wall of the inner body is porous.

\* \* \* \* \*